Feb. 12, 1963  W. N. CHRISTIAN  3,077,234
WIRE-LINE ACTUATED HYDRAULIC IMPACT DRILL
Filed May 14, 1958  14 Sheets-Sheet 1

INVENTOR
Willie N. Christian

BY *H. Hastings Ashley*

ATTORNEY

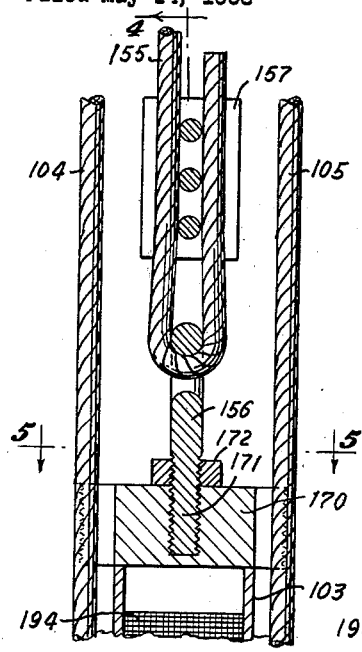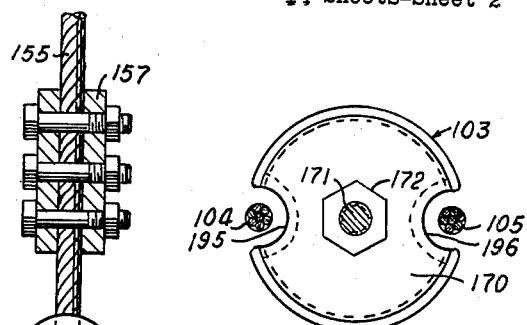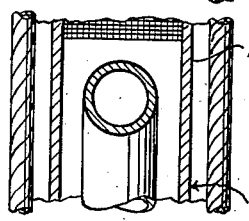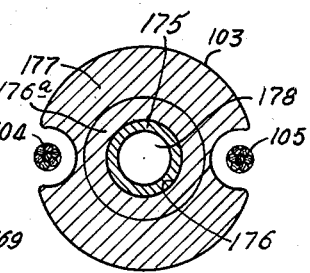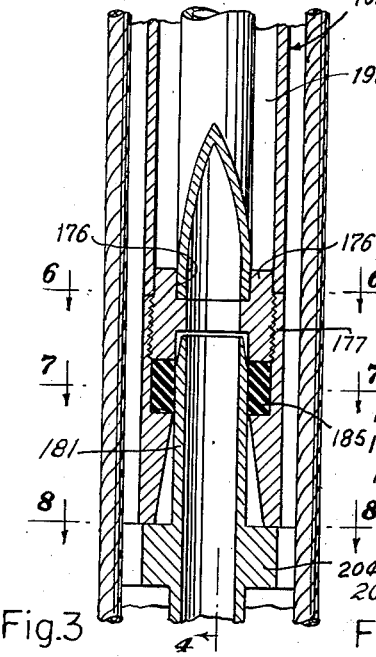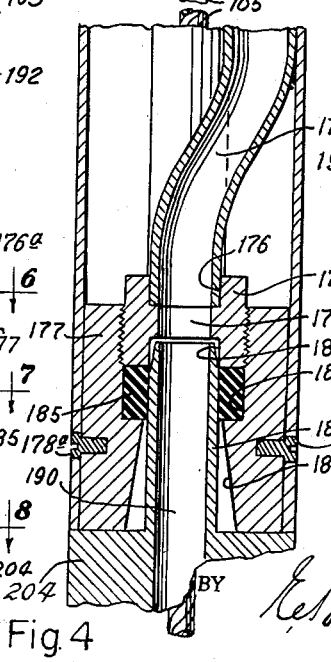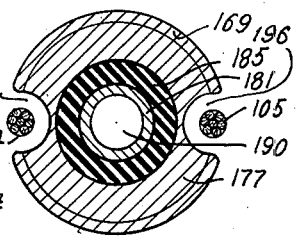
INVENTOR
Willie N. Christian

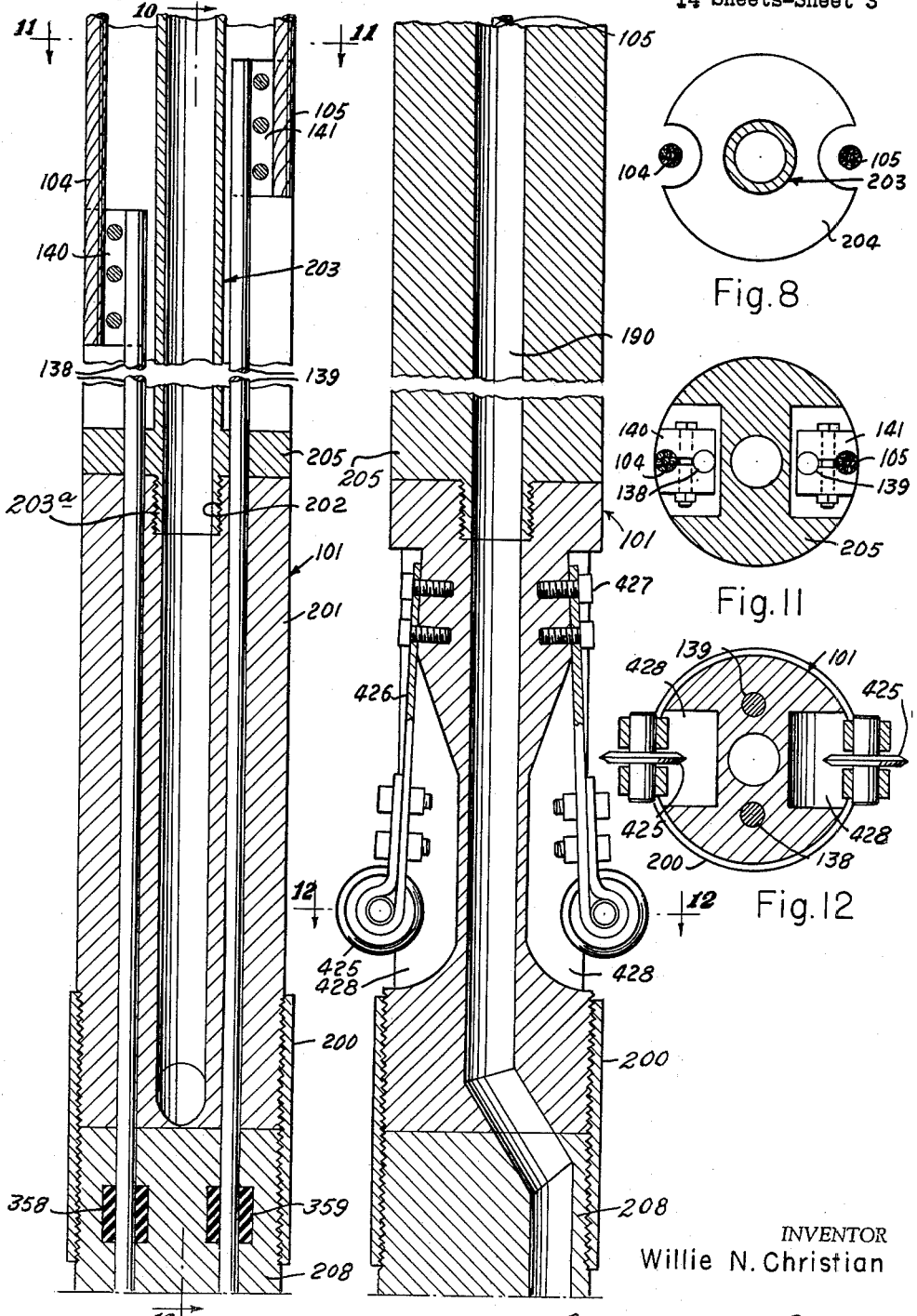

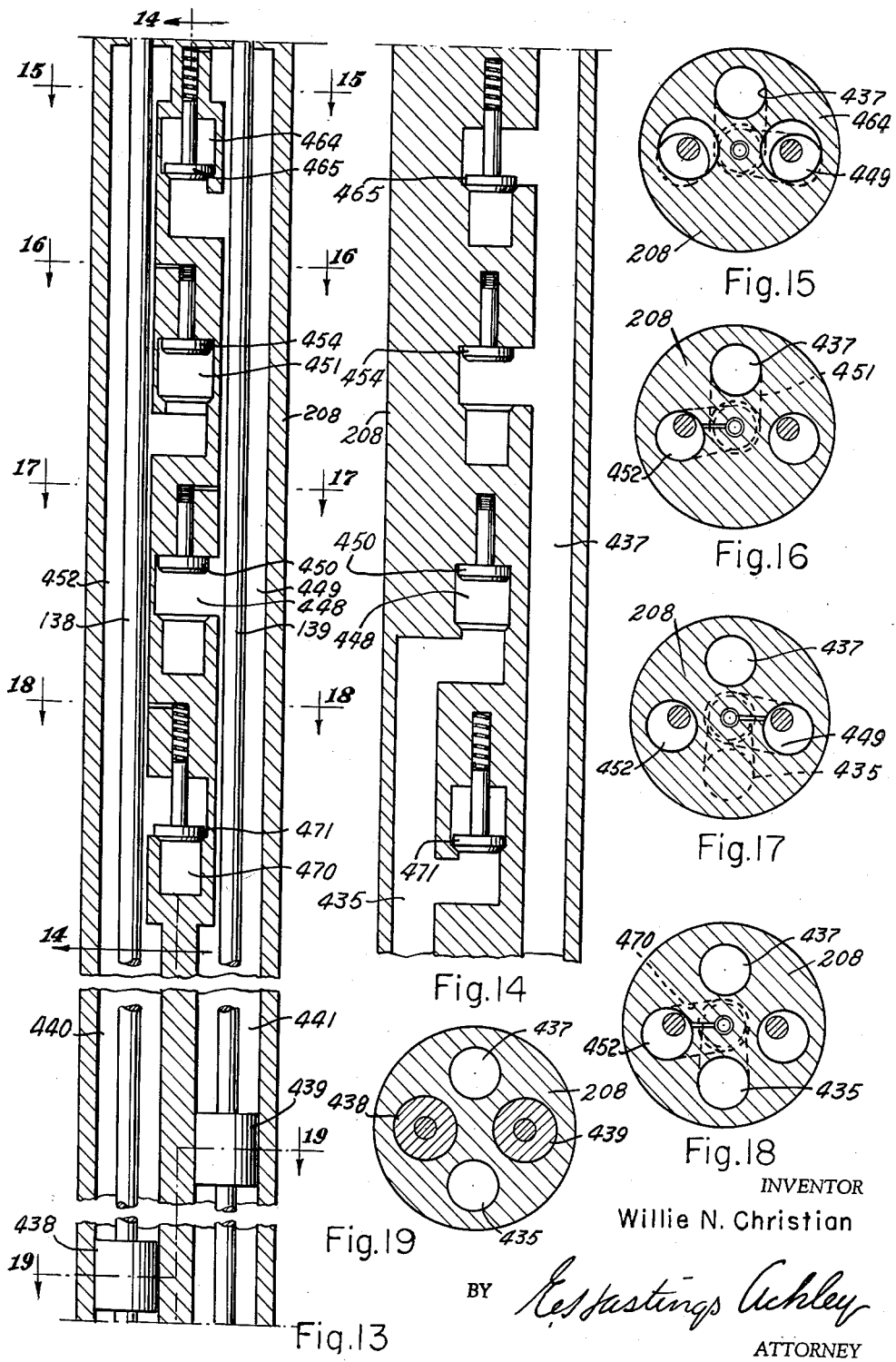

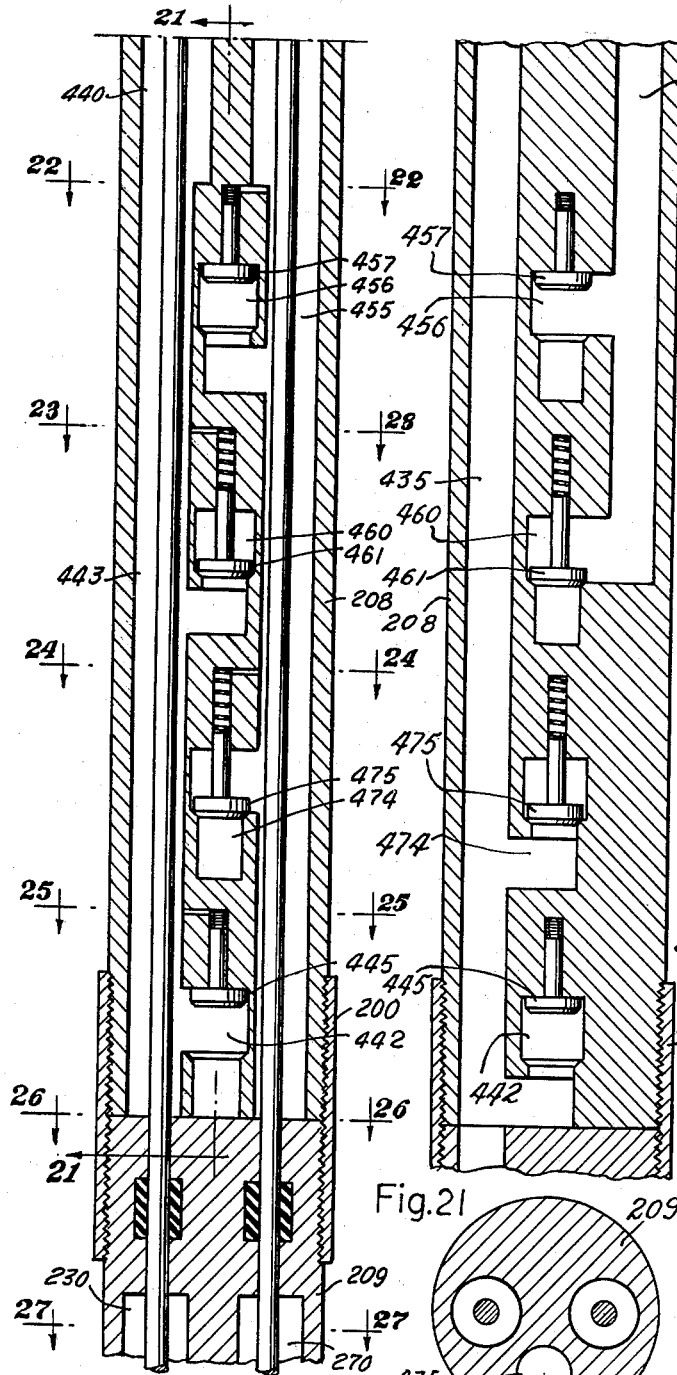

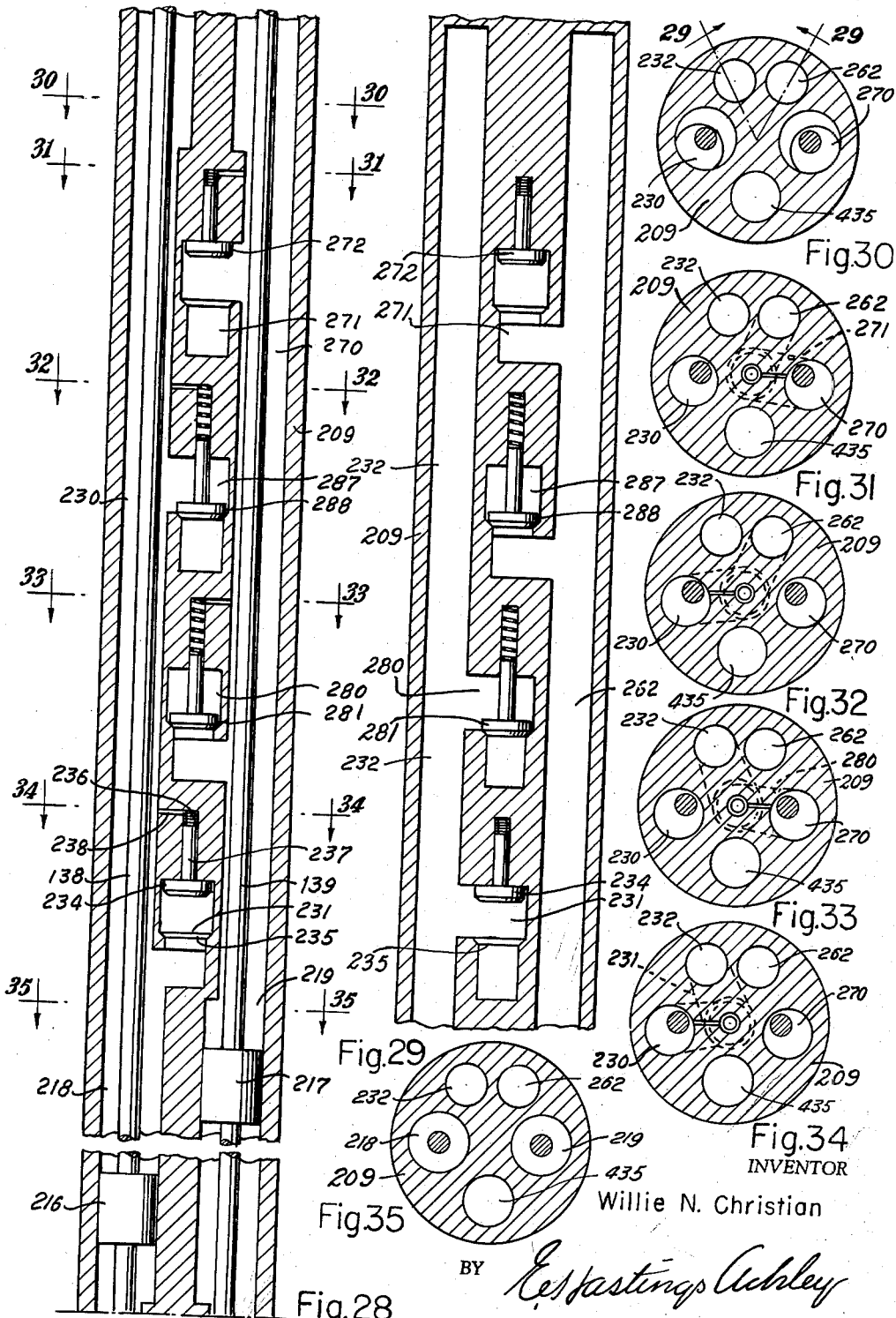

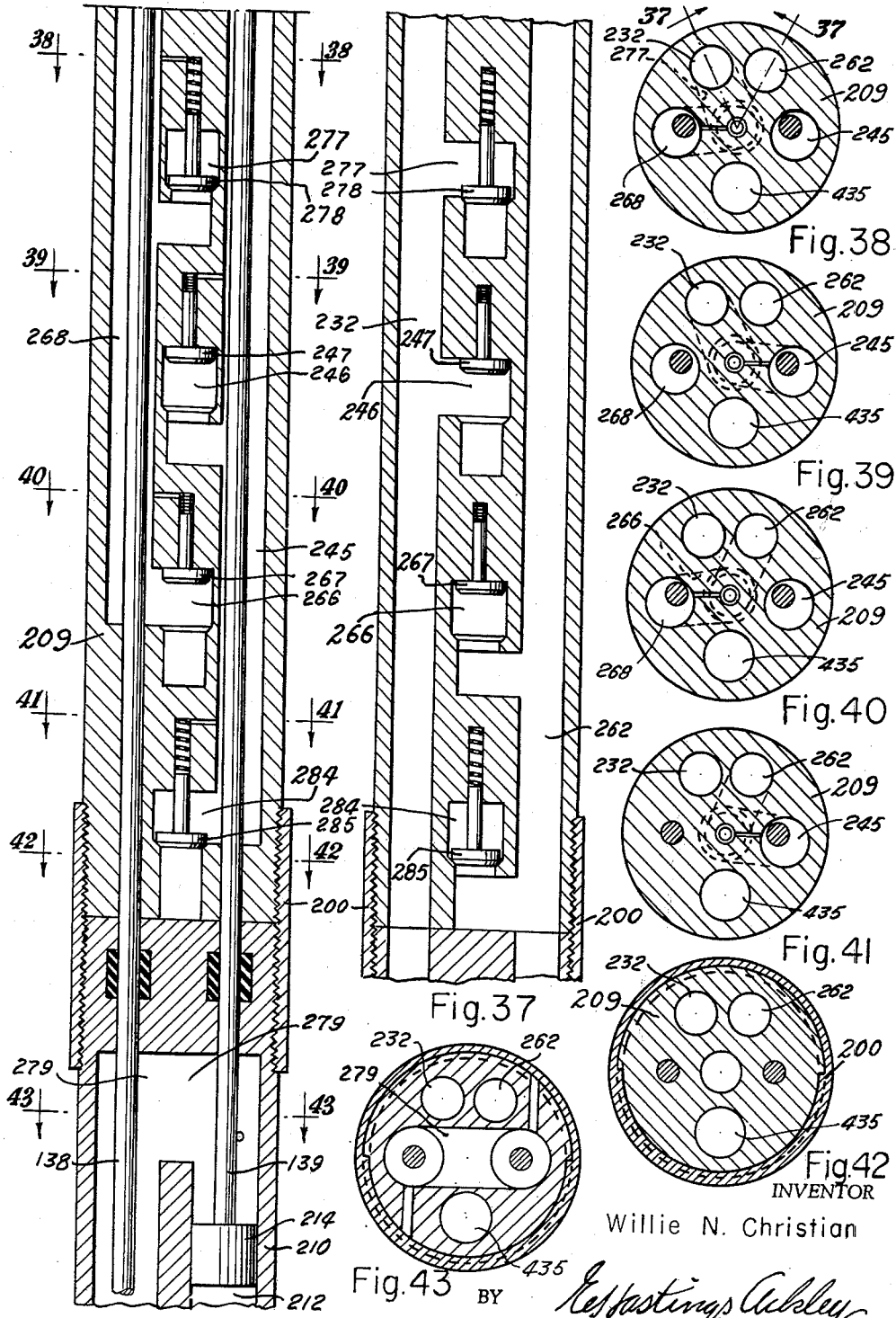

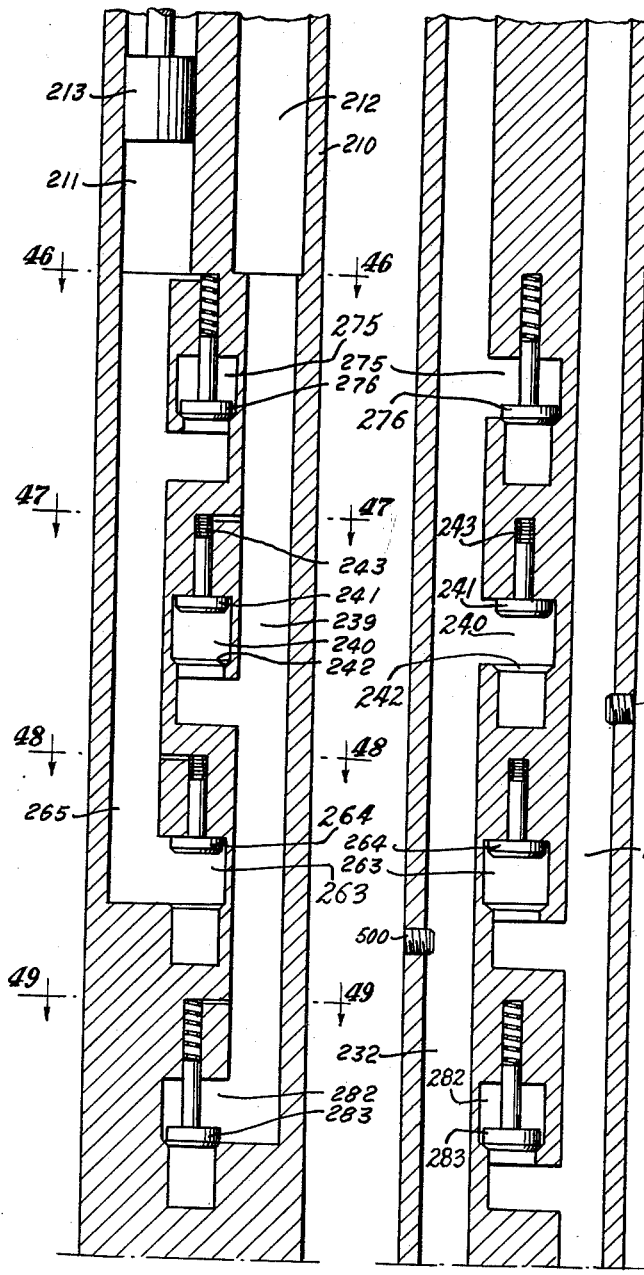
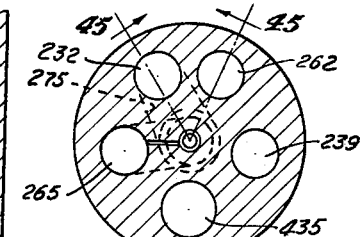
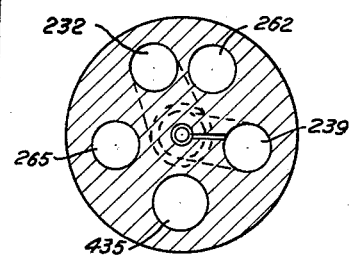
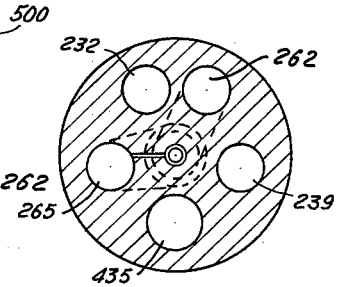
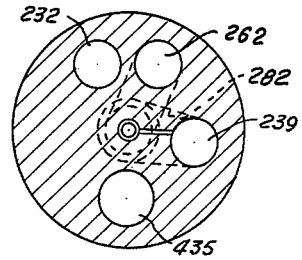
Fig. 44  Fig. 45  Fig. 46  Fig. 47  Fig. 48  Fig. 49
INVENTOR
Willie N. Christian

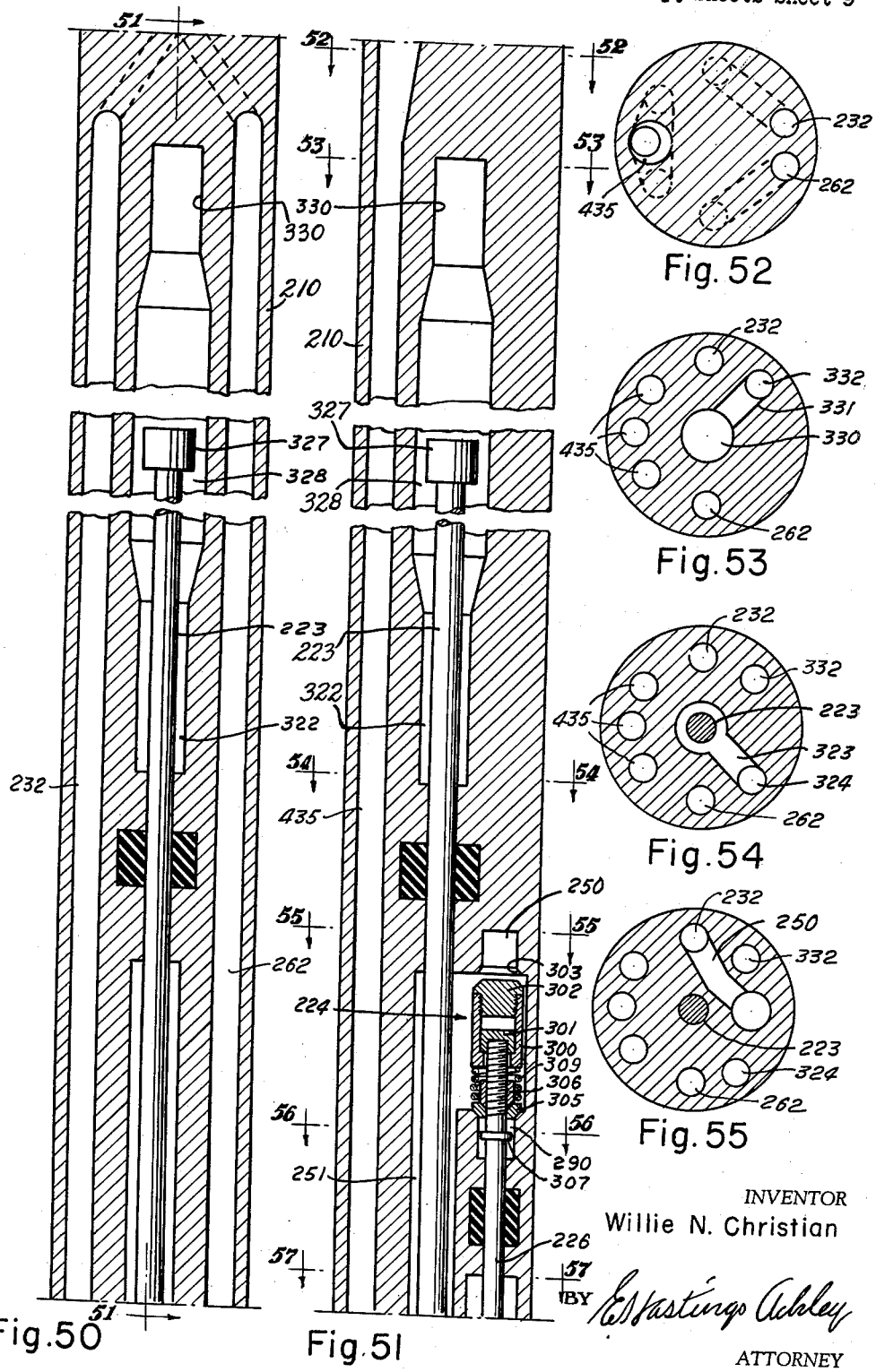

Feb. 12, 1963   W. N. CHRISTIAN   3,077,234
WIRE-LINE ACTUATED HYDRAULIC IMPACT DRILL
Filed May 14, 1958                                14 Sheets-Sheet 10

INVENTOR
Willie N. Christian

BY *Hastings Ashley*

ATTORNEY

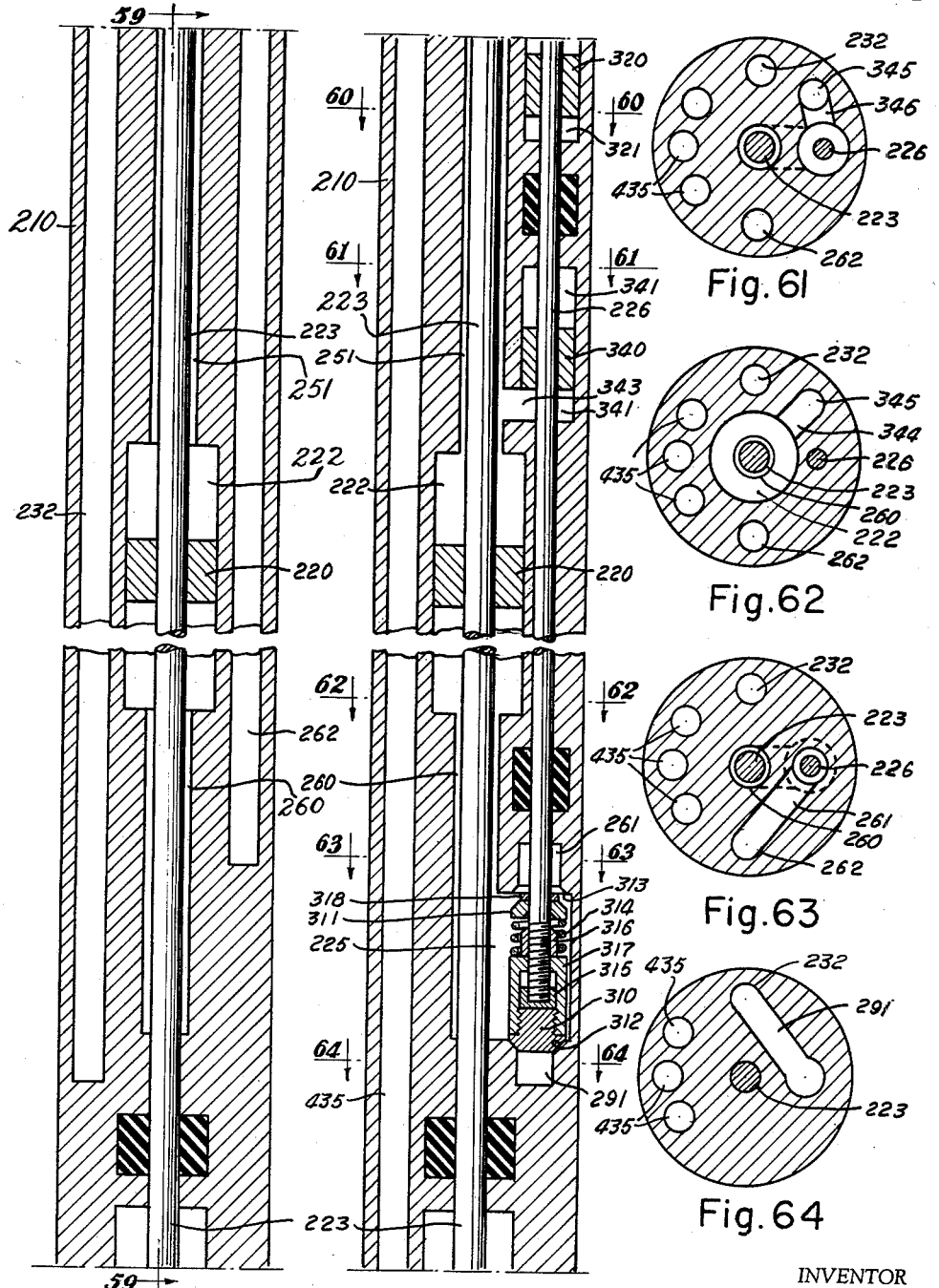

Feb. 12, 1963  W. N. CHRISTIAN  3,077,234
WIRE-LINE ACTUATED HYDRAULIC IMPACT DRILL
Filed May 14, 1958 14 Sheets-Sheet 12

INVENTOR
Willie N. Christian

BY *Hastings Ashley*

ATTORNEY

Feb. 12, 1963
W. N. CHRISTIAN
3,077,234
WIRE-LINE ACTUATED HYDRAULIC IMPACT DRILL
Filed May 14, 1958
14 Sheets-Sheet 13
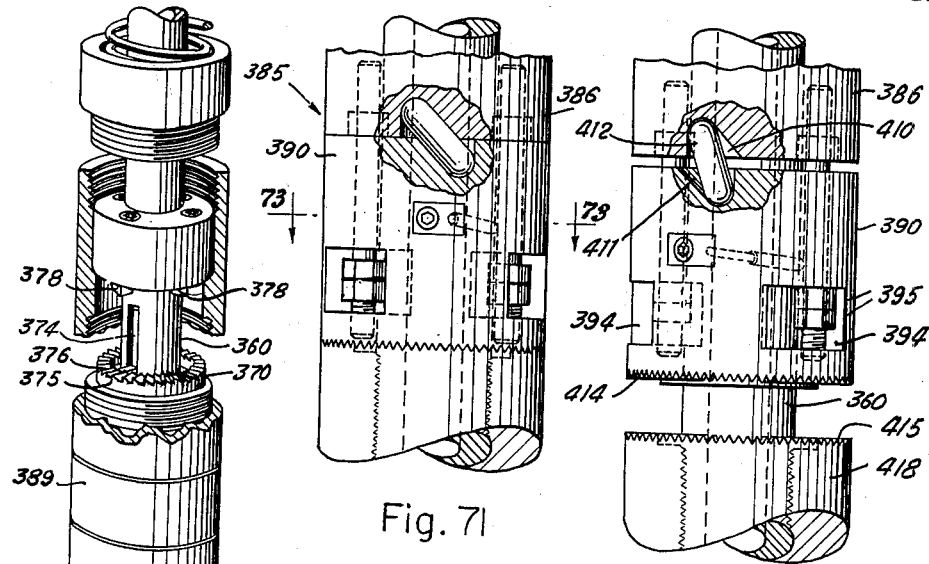
Fig. 71
Fig. 72
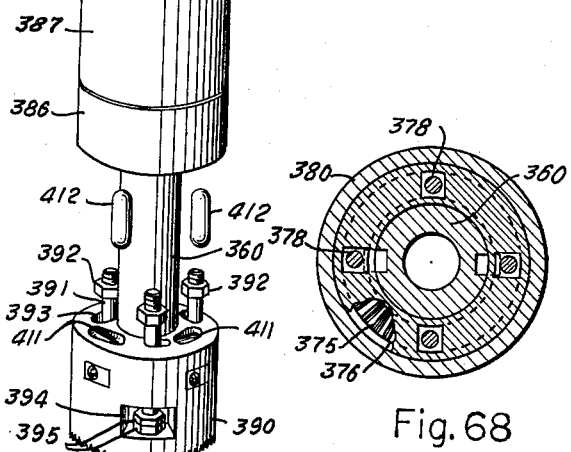
Fig. 68
Fig. 69
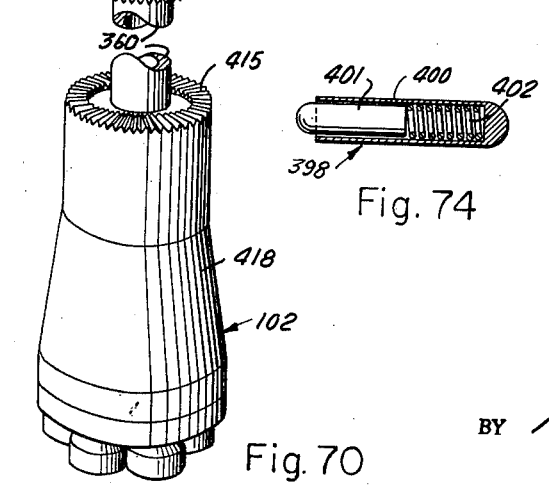
Fig. 70
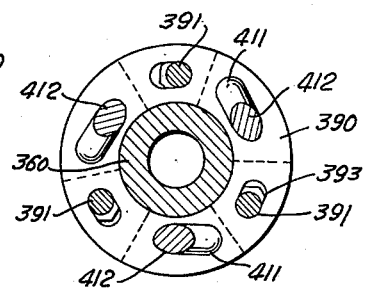
Fig. 74
Fig. 73
INVENTOR
Willie N. Christian
BY *E. Hastings Ackley*
ATTORNEY

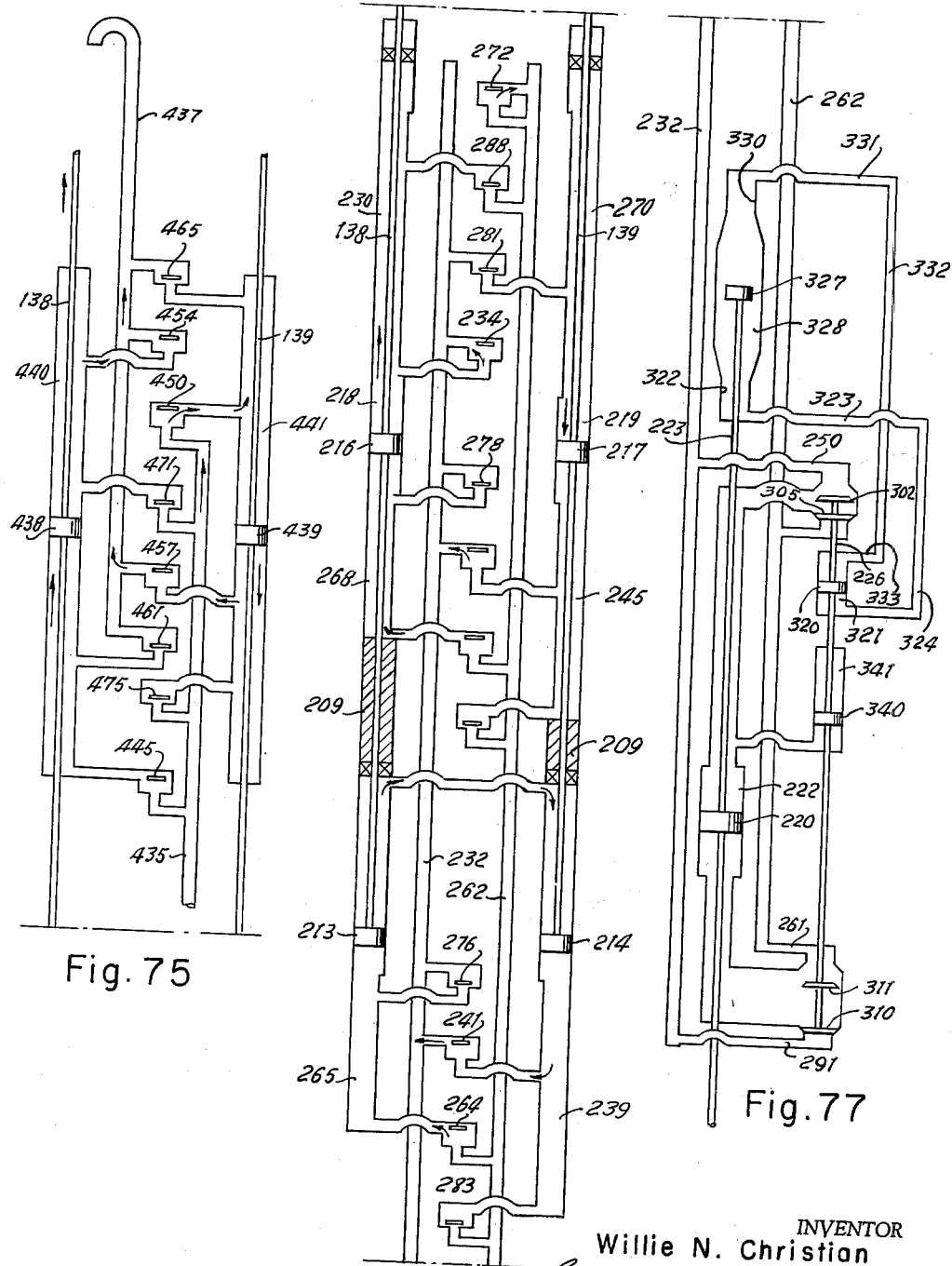

United States Patent Office 3,077,234
Patented Feb. 12, 1963

3,077,234
WIRE-LINE ACTUATED HYDRAULIC
IMPACT DRILL
Willie N. Christian, 306 Peoples Bank Bldg., Tyler, Tex.
Filed May 14, 1958, Ser. No. 735,242
17 Claims. (Cl. 175—93)

This invention relates to well tools and more particularly to well tools for drilling wells.

An object of this invention is to provide a well tool for drilling wells having a body on whose lower end is rotatably and longitudinally reciprocably mounted a drill bit.

A further object is to provide a well tool for drilling wells wherein the drill bit is biased upwardly by a resilient means in the body and wherein the body is provided with a reciprocably movable hammer for imparting downward blows to the drill bit.

A still further object is to provide a well tool wherein the body is provided with means for imparting a rotational movement to the drill bit upon each reciprocation of the drill bit with respect to the body.

Another object is to provide a well tool wherein the body is provided with a pair of oppositely and simultaneously reciprocable pistons operable from the surface of the earth for actuating the hammer.

Still another object is to provide a well tool wherein the pistons are operably connected to the hammer through an operating fluid contained in the body.

A further object is to provide a well tool wherein a plurality of valves are provided in the body to control movement of the operating fluid whereby a single reciprocation of the piston means results in a plurality of actuations of the hammer.

A further object is to provide a well tool having means for pumping the operating fluid into a pressure passage and having valve means for intermittently and alternately releasing the operating fluid into opposite ends of a piston cylinder to reciprocate the hammer.

A still further object is to provide a well tool for drilling wells wherein the body is provided with pump means for circulating the fluid from the bottom of the well to a bailer where the cuttings are screened from the fluids.

A still further object is to provide a well tool for drilling wells wherein the bailer means may be removed from the well to discard the cuttings while the drilling means is retained in the well.

A still further object is to provide a well tool for drilling wells wherein means are provided for equalizing the upward forces acting on the body to prevent upward movement of the body from the bottom of the well during reciprocal actuation of the piston means.

Additional objects and advantages of the invention will be readily apparent from the reading of the following description of a device constructed in accordance with the invention, and reference to the accompanying drawings thereof, wherein:

FIGURE 3 is an enlarged longitudinal section showing substantially the bailer and the upper part of the body of the well tool shown in FIGURE 1;

FIGURE 4 is a longitudinal sectional view taken on line 4—4 of FIGURE 3;

Figure 1:
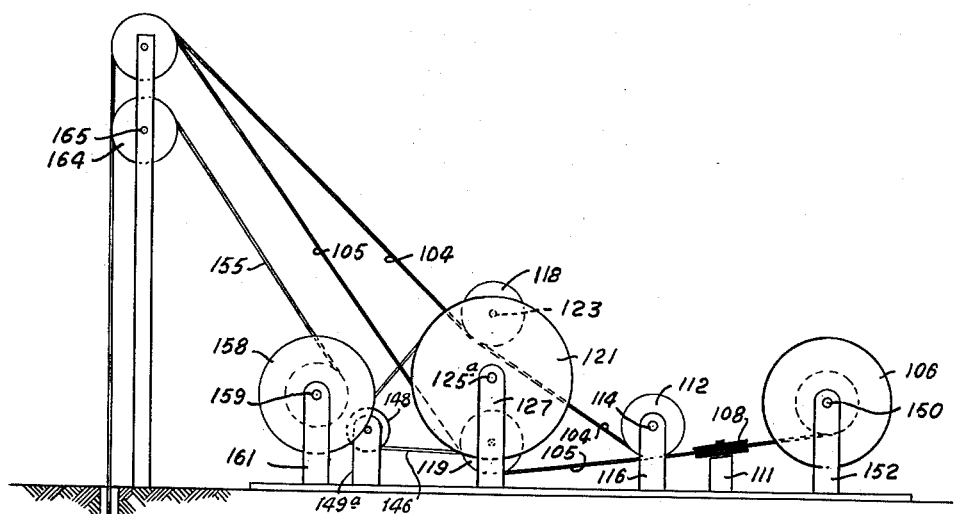
FIGURE 1 is a side view of the well tool for drilling wells showing the well tool in position in a well being drilled thereby and with the well tool operating means mounted on the surface adjacent the well.

FIGURES 5, 6, 7 and 8 are cross sectional views taken on lines 5—5, 6—6, 7—7 and 8—8, respectively, of FIGURE 3;

FIGURE 9 is a schematic longitudinal sectional view of the portion of the well tool immediately below and being a continuation of the portion shown in FIGURE 3;

FIGURE 10 is a sectional view taken on line 10—10 of FIGURE 9;

FIGURE 11 is a sectional view taken on line 11—11 of FIGURE 9;

FIGURE 12 is a sectional view taken on line 12—12 of FIGURE 10;

FIGURE 13 is a longitudinal sectional view showing substantially the portion of the tool immediately below and being a continuation of the portion shown in FIGURE 9;

FIGURE 14 is a sectional view taken on line 14—14 of FIGURE 13;

FIGURES 15, 16, 17, 18 and 19 are sectional views taken from lines 15—15, 16—16, 17—17, 18—18 and 19—19, respectively, of FIGURE 13;

FIGURE 20 is a schematic longitudinal sectional view of the portion of the well tool immediately below and being a continuation of the portion shown in FIGURE 13;

FIGURE 21 is a longitudinal sectional view taken on line 21—21 of FIGURE 20.

Figure 65:
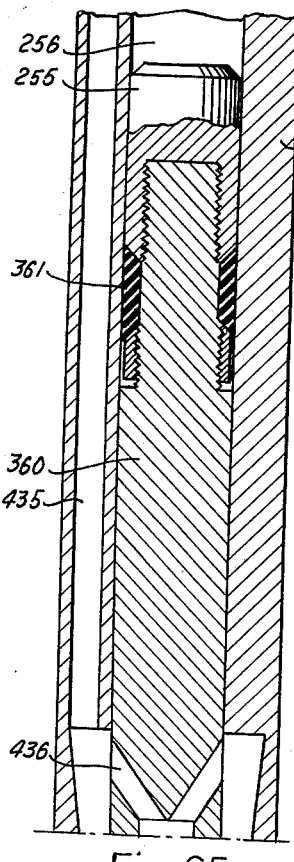
Figure 66:
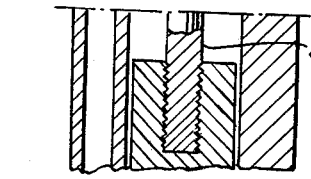
Figure 67:
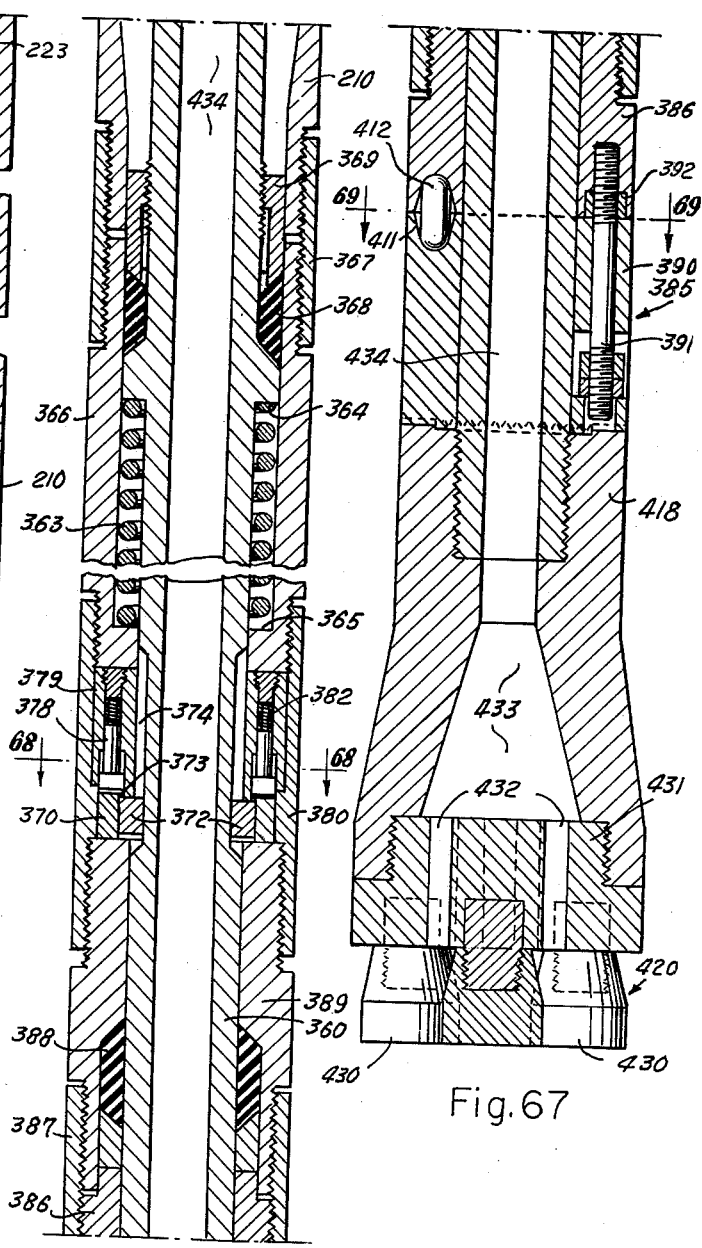

FIGURES 22, 23, 24, 25, 26 and 27 are cross sectional views taken on lines 22—22, 23—23, 24—24, 25—25, 26—26 and 27—27, respectively, of FIGURE 20;

FIGURE 28 is a schematic longitudinal sectional view of the portion of the well tool immediately below and being a continuation of the portion shown in FIGURE 20;

FIGURE 29 is a sectional view taken on line 29—29 of FIGURE 30;

FIGURES 30, 31, 32, 33, 34 and 35 are cross sectional views taken on lines 30—30, 31—31, 32—32, 33—33, 34—34 and 35—35, respectively, of FIGURE 28;

FIGURE 36 is a schematic longitudinal sectional view of the portion of the well tool immediately below and being a continuation of the portion of the well tool shown in FIGURE 28;

FIGURE 37 is a section taken on line 37—37 of FIGURE 38;

FIGURES 38, 39, 40, 41, 42 and 43 are cross sectional views taken on lines 38—38, 39—39, 40—40, 41—41, 42—42 and 43—43, respectively, of FIGURE 36;

FIGURE 44 is a schematic longitudinal sectional view of a portion of the well tool immediately below and being a continuation of the portion shown in FIGURE 36;

FIGURE 45 is a sectional view taken on line 45—45 of FIGURE 46;

FIGURES 46, 47, 48 and 49 are cross sectional views taken on lines 46—46, 47—47, 48—48 and 49—49, respectively, of FIGURE 44;

FIGURE 50 is a schematic longitudinal sectional view of a portion of the well tool immediately below and being a continuation of the portion shown in FIGURE 44;

FIGURE 51 is a longitudinal sectional view taken on line 51—51 of FIGURE 50;

FIGURES 52, 53, 54, 55, 56 and 57 are cross sectional views taken on lines 52—52, 53—53, 54—54, 55—55, 56—56 and 57—57, respectively, of FIGURE 51;

FIGURE 58 is a schematic longitudinal sectional view of a portion of the well tool immediately below and being a continuation of the portion shown in FIGURE 50;

FIGURE 59 is a longitudinal sectional view taken on line 59—59 of FIGURE 58;

FIGURES 60, 61, 62, 63 and 64 are cross sectional views taken on lines 60—60, 61—61, 62—62, 63—63 and 64—64, respectively, of FIGURE 59;

FIGURE 65 is a schematic longitudinal sectional view of a portion of the well tool immediately below and being a continuation of the portion shown in FIGURE 58;

FIGURE 66 is a schematic longitudinal sectional view of a portion of the well tool immediately below and being a continuation of the portion shown in FIGURE 65;

FIGURE 67 is a schematic longitudinal sectional view of the bottom lower end portion of the well tool and being below and a continuation of the portion shown in FIGURE 66;

FIGURE 68 is a cross sectional view with some portions broken away, taken on line 68—68 of FIGURE 66;

FIGURE 69 is a cross sectional view taken on line 69—69 of FIGURE 67;

FIGURE 70 is a perspective, partly exploded view of the lower end of the well tool, with some portions broken away;

FIGURE 71 is a fragmentary plan view, with portions broken away, of a bit rotator comprising a portion of the well tool showing the rotator in its upper position;

FIGURE 72 is a view similar to FIGURE 71 showing the bit rotator in its lower position prior to the rotation of the bit a predetermined distance about its longitudinal axis;

FIGURE 73 is a cross sectional view taken on the lines 73—73 of FIGURE 71;

FIGURE 74 is a sectional view of one of the elements of the well tool; and,

FIGURES 75, 76 and 77 are schematic representations of the hydraulic systems of the well tool for drilling wells, FIGURE 76 being a continuation of FIGURE 75 and FIGURE 77 being a continuation of FIGURE 76.

Figure 2:
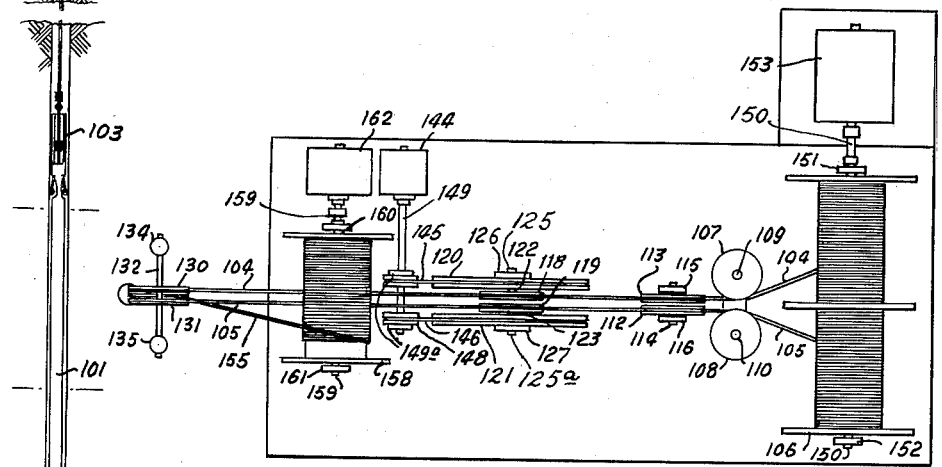
FIGURE 2 is a plan view of the well tool operating means shown in FIGURE 1.
Figure 56:
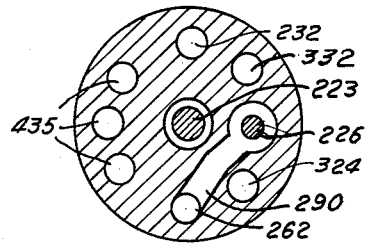
Figure 60:
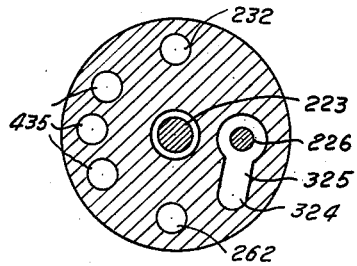
Figure 57:
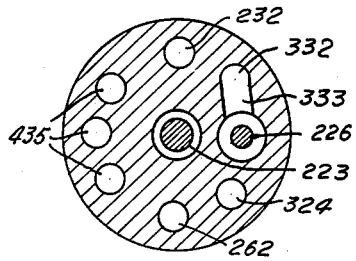

Referring now particularly to FIGURES 1 and 2 of the drawings, the well tool 100 includes a body 101 on whose lower end is rotatably and longitudinally movably mounted a drill bit 102 and on whose upper end is mounted a bailer 103. The well tool 100 is operated by a pair of operating cables 104 and 105 whose ends are wound on a double winch 106.

The operating cables 104 and 105 extend from the double winch 106 past a pair of direction changing sheaves 107 and 108, respectively, which are rotatable about shafts 109 and 110 mounted on a supporting pedestal 111. The operating cables also extend past and engage a pair of vertical sheaves 112 and 113, respectively, rotatably mounted for rotation about horizontal axes on the shaft 114 mounted on standards 115 and 116. The operating cables then engage a pair of operating sheaves 118 and 119 rotatably mounted on a pair of discs or wheels 120 and 121, by means of suitable shafts 122 and 123. The discs 120 and 121 are rigidly mounted on horizontal shafts 125 and 125a supported by standards 126 and 127. The operating cables 104 and 105 extend upwardly from the operating sheaves 118 and 119 to and over a pair of direction changing sheaves 130 and 131, respectively, rotatably mounted on a shaft 132 supported on the upper end of a pair of posts 134 and 135. From the sheaves 130 and 131 the operating cables 104 and 105 extend downwardly into the well and have their lower ends connected to a pair of operating rods 138 and 139, respectively, by means of suitable clamps 140 and 141, respectively.

The operating discs 120 and 121 are rotated by means of a prime mover 144 which is connected to the discs or wheels 120 and 121 by means of belts or chains 145 and 146 which extend about the wheels and about pulleys 147 and 148, respectively, rigidly mounted on the shaft 149 of the prime mover. The shaft 149 may be journalled in suitable studs 149a. It will be apparent that as the discs 120 and 121 rotate the operating sheaves 118 and 119, which are disposed on opposite sides of the shaft 125, travel in a circular path alternately pulling one operating cable upwardly out of the well and then allowing it to move downwardly in the well while simultaneously allowing the other cable to move downwardly in the well and then pulling it upwardly out of the well thereby effecting an alternate and simultaneous reciprocation of the operating rods 138 and 139.

The shaft 150 of the double winch 106 is also rotatably mounted on standards 151 and 152 and connected to a prime mover 153, such as an electric motor, which may be actuated to either lower or raise the well tool 100 in the well by reeling or unreeling the operating cables 104 and 105.

The bailer 103 may be separately moved upwardly in the well by means of a cable 155 which has its lower end secured to the eye-bolt 156 projecting from the upper end of the bailer by means of a suitable clamp 157. The other end of the cable is secured to the winch 158 whose shaft 159 is rotatably mounted on standards 160 and 161 and driven by a prime mover 162, such as an electric motor. The bailer cable 155 extends over a direction changing sheave 164 rotatably mounted between the posts 134 and 135 by means of a shaft 165 mounted on the posts.

While the prime movers 144, 153 and 162 have been shown as separate electric motors it will be understood that the shafts 149, 150 and 159 could be driven from a single prime mover, such as a single electric motor, as a diesel or gasoline engine, by the provision of a suitable clutch and transmission means between the driving shaft of such single prime mover and the shafts 149, 150 and 159 which would permit selective independent rotation of these shafts.

The bailer 103 includes a hollow longitudinal body 169 whose upper end is closed by a plug 170 threaded thereinto, the plug being provided with an upwardly opening threaded bore into which the threaded shank 171 of the eye-bolt 156 is received. A lock nut 172 on the eye-bolt shank 171 is provided to lock the eye-bolt against rotation with respect to the plug 170.

A downwardly directed discharge spout 175 is disposed within the bailer body 169 and has its lower end friction fitted in an annular recess 176 of a sleeve 176a in the bore 178 of the bottom wall or end plug 177 of the bailer. The bottom wall or end plug 177 is secured to the body 169 by bolts or screws 178a. The interior passageway 179 of the discharge duct communicates with an upward extension duct 181 of the well tool body 101. The extension duct 181 is guided into the bottom wall 177 by the outwardly and downwardly extending conical shoulder or surface 182 of the bailer bottom wall 177. A sealing or packing means 185 is mounted between a suitable annular shoulder 186 of the bottom wall 177 and the bottom of the sleeve 176a to engage and seal between the bailer bottom wall 177 and the extension duct 181 when the extension duct is in operative position with respect to the bailer.

It will be apparent that the passageway 190 of the extension duct registers with the passageways 178 and 179 of the bottom wall 177 so that fluids may flow upwardly therethrough into the passageway 179 of the discharge duct and be discharged downwardly through the downwardly opening end 191 of the discharge duct into interior chamber 192 of the bailer. The bailer body 169 is provided adjacent its upper end above the discharge duct with the screen portion 194 which permits outward flow of fluid from the inner chamber 192 but prevents any cuttings or the material carried by such fluid from flowing outwardly of the bailer body whereby the bailer serves to filter the fluid flowing therethrough and trap such cuttings or other solid materials whereby they are separated from such fluid.

The body of the bailer 103 is provided with two diametrically oppositely disposed recesses or grooves 195 and 196 through which extend the operating cables 104 and 105, respectively.

The body 101 of the well tool includes a plurality of sections connected at their adjoining ends by couplings 200 into which such adjacent ends of the sections are threaded. Gaskets, not shown, are interposed between adjacent ends of such sections to seal therebetween and prevent leakage of fluids therebetween. Such gaskets of course are provided with suitable registering apertures wherever passageways occur at such ends of such sections. While a relatively small number of such body sections are shown, it will be understood that these are shown schematically as explanatory of the greater number actually constituting the tool body 101. Each shown and numbered body section may actually be comprised of several sections joined by couplings 200.

The uppermost section 201 of the well tool body 101 is counterbored as at 202 to receive the lower threaded portion 203a of a duct member 203 whose upper end constitutes the extension duct 181. The duct member 203 is provided with an upper flange 204 which is adapted to engage the lower end of the bailer body and thus act as a stop means and a lower external flange 205 which is adapted to engage the upper end of the uppermost body section 201 and also act as a stop means. The clamps 140 and 141 which connect the operating cables 104 and 105 with the operating rods 138 and 139 are disposed between the two flanges 204 and 205 and their upper and lower limits of reciprocal motion are defined by these flanges.

The operating rods 138 and 139 extend downwardly through aligned apertures in the flange 205 of the duct member 203, the body section 201, the body section 208, the body section 209, and the body section 210 into a pair of pump piston chambers 211 and 212. The operating rods 138 and 139 are provided at their lower ends with pistons 213 and 214 which are slidable in the pump piston chambers 211 and 212, respectively.

The operating rods 138 and 139 are also provided intermediate their ends with pump pistons 216 and 217, respectively, which are slidable in pump piston chambers or cylinders 218 and 219 in the body section 209. The pistons 213, 214, 216 and 217 circulate a retained prepressurized compressible fluid, such as air, through various passageways, as will be described below, to operate a hammerlift piston 220 (FIGURE 58).

The fluid pumped by the pump pistons of the operating rods is alternately delivered into the piston cylinder 222 of the body section 210 on opposite sides of the hammerlift piston 220 to effectuate up and down movement of the hammerlift piston rod 223 by means of a pair of control valves 224 and 225 which are operated by a valve rod 226. When the pump pistons 213 and 216 of the operating rod 138 are moving upwardly, the fluid above the piston 216 is forced upwardly by the piston 216 through the conduit 230 of the body section 209, through which the operating rod 138 extends, through a lateral passage 231 into a pressure passage or chamber 232. The transverse passage 231 is provided with a check valve 234 which is adapted to seat on the valve seat 235 to close the passage 231. The check valve 234 is biased downwardly toward a closed position by a resilient member or spring 236 which is disposed in a bore above the valve 234 and bears against the stem 237 thereof. A relief passage 238 communicates with the bore in which the valve stem 237 is slidably disposed to permit escaped fluid from the bore above the valve stem 237. It will be apparent that as the pressure of the fluid in the piston cylinder 218 increases, such fluid pressure will be communicated to the check valve 234 and will lift it off its valve seat 235 to permit flow of fluid from the piston cylinder 218 into the transverse passage 231 and thence to the pressure passage 232. During the upward movement of the pump piston 213 the fluid above the piston 213 in the piston chamber 211 flows through the passage 279 into the piston chamber 212 above the piston 214 to equalize or balance the pressures above the pistons 213 and 214. Downward movement of the pump piston 214 forces the fluid below the pump piston 214 into the longitudinal passage 239 of the body 210 and thence through the transverse passage 240 into the pressure passageway 232. The flow of fluid through the transverse passage 240 is controlled by a check valve 241 which is biased downwardly into closed position on its seat 242 by a spring 243.

Downward movement of the pump piston 217 in its cylinder 219 similarly forces the fluid in the cylinder 219 below the pump piston 217 downwardly into a passage 245 and thence through a transverse passage 246 controlled by a check valve 247 into the pressure passageway 232. It will thus be seen that when the operating rod 138 is moving upwardly and the operating rod 139 is simultaneously moving downwardly the pump piston 216 and the pistons 214 and 217 force or pump the pressurized fluid from their respective cylinders through suitable passageways controlled by check valves, which are similar in structure in all respects with the check valve 234 and will not therefore be described in greater detail, into the pressure passageway 232.

When the control valves 224 and 225 are in the positions shown in FIGURES 51 and 59 the fluid in the pressure passageway 232 flows through the transverse passageway 250 and the longitudinal passageway 251 into the hammerlift piston cylinder 222 above the hammerlift piston 220 thus forcing the hammerlift piston 220 and its rod 223 downwardly whereby the hammer 254 threaded on the lower end of the hammerlift piston rod 223 imparts a blow to the anvil 255. The hammer and the anvil are slidably positioned in a longitudinal bore 256.

When the hammerlift piston 220 is moving downwardly it forces the fluid in the cylinder 222 below the hammerlift piston into the longitudinal passage 260 and thence through a transverse passage 261 into a longitudinal relief passageway 262. From the relief passageway 262 the fluid moves through a transverse passage 263 controlled by a check valve 264 into a longitudinal passageway 265 which communicates with the piston cylinder 211 below the pump piston 213. Simultaneously some of the fluid from the relief passageway 262 moves through the transverse passage 266 controlled by the check valve 267 into the longitudinal passageway 268 which communicates with the piston cylinder 218 below the pump piston 216. Thus it will be seen that the pump pistons 213 and 216 of the operating rod 138 are free to move upwardly to force the fluid trapped in their respective cylinders above them into the pressure passageway 232 since fluids are permitted to flow into such cylinders below the pistons in the manner described above being forced thereinto by the downward movement of the hammerlift piston 220. Simultaneously also the fluid from the relief passageway 262 moves into the passageway 270 through a transverse passage 271 controlled by a check valve 272, the passage 270 communicating with the upper end of the piston cylinder 219 above the pump piston 217. Thus it will also be apparent that the pump piston 217 of the operating rod 139 is free to move downwardly since fluid may flow into the upper end of the piston cylinder 219 thereabove in the manner described when the hammerlift piston 220 is moving downwardly in its cylinder 222.

Conversely when the operating rod 138 is moved downwardly the fluid below the pump piston 213 is forced out of the piston cylinder 211 downwardly into the passageway 265 and thence through a transverse passage 275 into the pressure passageway 232. The check valve 276 which controls the flow of fluid through the transverse passage 275 moves upwardly as the pressure of the fluid in the passageway 265 increases as the pump piston 213 moves downwardly. Simultaneously, the fluid in the piston cylinder 218 below the pump piston 216 is forced into the passageway 268 as the piston 216 moves downwardly and thence into the transverse passageway 277 and thence into the pressure passageway 232. The check valve 278 is moved upwardly against the resistance of its spring by the fluid in the longitudinal passageway 268 as the pump piston 216 moves downwardly. Simultaneously the operating rod 139 moves upwardly and the fluid in the piston cylinder 219 above the pump piston 217 is forced upwardly into the longitudinal passageway 270 and thence into the passage 280 to the pressure passageway 232, the check valve 281 opening to permit such flow due to the increase in the fluid pressure in the passageway 270 when the piston 217 moves upwardly. The fluid in the piston cylinder 212 above the pump piston 214 of course flows upwardly and then laterally through the transverse passage 279 into the upper end of the piston cylinder 211 above the pump piston 213 during such upward movement of the operating rod 139 to equalize or balance the pressures above the pistons 213 and 214. It will thus be apparent that the check valves 234, 241, 272, 267, 247 and 264 are opened when the operating rod 138 is moving upwardly and the operating rod 139 is moving downwardly and that these valves close and the check valves 281, 288, 285, 278, 283 and 276 open when the operating rods 138 and 139 are moving in the opposite directions, that is when the operating rod 138 is moving downwardly and the operating rod 139 is moving upwardly.

When the operating rod 138 is moving downwardly fluid from the relief longitudinal passageway 262 flows into the piston cylinder 212 below the pump piston 214 through the passageway 282 controlled by the check valve 283 and the longitudinal passageway 239. Simultaneously the fluid flows into the piston cylinder 219 below the pump piston 217 when the operating rod 139 is moving upwardly from the relief longitudinal passageway 262 through the transverse passage 284 controlled by the check valve 285 and the longitudinal passageway 245. Fluid flows into the piston cylinder 218 above the pump piston 216, while the operating rod 138 is moving downwardly, from the relief longitudinal passageway 262 through the transverse passage 287 controlled by the check valve 288 and the longitudinal passage 230.

Thus it will now be seen that the various check valves permit flow of fluid into the piston cylinders behind the pump pistons as they move in one direction from the relief longitudinal passageway 262 and that various other check valves permit flow of fluid from the various piston cylinders ahead of the pump pistons into the pressure passageway 232 regardless of the direction in which the pistons are moving.

Each time the hammerlift piston 220 reaches the lowermost point in its travel the control valves 224 and 225 are moved upwardly to close the transverse passages 250 and 261 and simultaneously open the transverse passageways 290 and 291. Fluid from the hammerlift piston cylinder 222 above the hammerlift piston 220 then flows through the passages 251 and 290 into the relief longitudinal passageway 262 while simultaneously fluid from the pressure longitudinal passageway 232 flows into the hammerlift piston cylinder 222 below the hammerlift piston 220 through the passage 291 and passageway 260. Thus it will be seen that the opposite ends of the piston cylinder 222 are alternately and simultaneously connected, as the hammerlift piston reaches the extreme limits of its longitudinal movement, to the pressure passageway 232 and the relief passageway 262 whereby a continuous reciprocal movement of the hammerlift piston and therefore of the hammer 254 is obtained as long as the pressure of the operating fluid in the pressure passageway 232 is maintained above a predetermined value by the action of the pump pistons.

The control valves 224 and 225 are connected to opposite ends of a control rod 226. The control valve 224 includes a housing 300 slidably mounted on the upper end of the control rod 226 for limited movement by means of a nut 301 which engages an internal flange of the housing. The valve 302 engages the valve seat 303 when the valve rod 226 is in an upper position to close the passage 250. A second valve 305 is slidably mounted on the control rod 226 between a nut 306 and an external flange 307 of the control rod and is adapted to engage the valve seat 308 to close the passage 290 when the control rod 226 is in its lower position. The valve housing 300 and the valve 305 are biased in opposite directions by a spring 309 which is disposed about the control rod and has opposite ends which bear against the valve housing 300 and against the valve 305.

It will be apparent that when the control rod 226 is in the lower position shown in FIGURE 51, the biasing spring 309 urges the valve 305 against its valve seat 308 and thus closes the passage 290 while simultaneously the nut 301 holds the valve housing and therefore the valve 302 downwardly away from the valve seat 303 whereby the passage 250 is open. Conversely when the control rod 226 is raised to an upper position the biasing spring 309 yieldably urges and holds the valve 302 against its valve seat 303 whereby the passage 250 is closed while simultaneously the annular flange 307 engages and holds the valve 305 upwardly away from its valve seat 308 whereby the passage 290 is open.

The control valve 225 is identical in all respects with the control valve 224 having oppositely facing valves 310 and 311 which are adapted to engage the valve seats 312 and 313, respectively, to close the passages 291 and 261. The valve seats are biased in opposite directions by spring 314. The movement of the two valves on the lower end of the control rod 226 is limited by the nuts 315 and 316 which are adapted to engage the valve housing 317 of the valve 310 and by the external flange or nut 318, threaded or otherwise secured to the control rod, which is adapted to engage the valve 311.

The control rod is reciprocated from one extreme position to another each time the hammerlift piston 220 reaches an extreme limit of its movement in either direction by means of the control piston 320 of the control rod 226 which is slidable in a control piston cylinder 321. The control piston 320 is moved upwardly each time the hammerlift piston 220 reaches the bottom of its stroke by means of a compressible fluid, such as air, which is introduced into the control piston cylinder 321 from a piston cylinder 322 through a transverse passage 323, a longitudinal passage 324 and a transverse passage 325. The compressed fluid in the piston cylinder 322 is forced through such passageways into the piston cylinder 321 below the control piston 320 by a compression piston 327, mounted on the hammerlift piston rod 223, when it moves from the enlarged chamber 328 above the compression cylinder 322 into the compression cylinder 322 as the hammerlift piston moves downwardly in its cylinder. When the pressure in the cylinder 321 below the control piston 320 increases, the control rod 226 is moved upwardly to its upper position wherein the passage 250 is closed and the passage 290 is opened and the passage 261 is closed and the passage 291 is opened. When the hammerlift piston 220 approaches the upper limit of its movement, the compression piston 327 moves from the large chamber 328 into an upper compression cylinder 330 and forces the compressible fluid from the upper compression cylinder 330 into the control piston cylinder 321 above the control piston 320 through the passages 331, 332 and 333 whereby the piston 320 is moved downwardly causing the valves 224 and 225 to again close the passages 290 and 291 and simultaneously open the passages 250 and 261. In this manner by means of the compression piston 327, the control valves 224 and 225 are caused to operate in synchronism with the movement of the hammerlift piston 220.

Since the valves 305 and 312 are subjected to a high pressure when the hammerlift piston 220 is moving downwardly and since the valves 311 and 302 are subjected to a similar high pressure when the hammerlift piston is moving upwardly, it is desirable to equalize or balance the forces acting on the control valves to facilitate their opening. This is accomplished by means of a balancing piston 340 rigid with the control rod 226 and slidable in a cylinder 341. The lower end of the cylinder 341 is connected to the upper end of the hammerlift piston cylinder 222 by the passages 251 and 343 while the upper end of the cylinder 341 is connected to the lower end of the hammerlift piston cylinder 222 by a transverse passage 346, a longitudinal passage 345 and a transverse passage 344. Thus when the hammerlift piston 220 is being moved downwardly, the high pressure fluid in the upper end of the piston cylinder 222 passes into the lower end of the balancing piston cylinder 341 and thus acts upwardly on the balancing piston 340 thus aiding the piston 320 in opening the valves 310 and 305. Conversely when the high pressure fluid is admitted to the lower end of the hammerlift piston cylinder 222 to move the hammerlift piston upwardly, such high pressure is also transmitted into the upper end of the balancing piston cylinder 341 to act on the balancing piston 340 to aid the control piston 320 in moving the control rod 226 downwardly to open the valves 311 and 302.

Thus the hammerlift piston 220 is caused to reciprocate several times by means of the control valves 224 and 225 during each reciprocal movement of the control rods delivering a plurality of blows to the anvil 255 of the drill bit 102.

The body sections are provided with suitable packers or seal means which seal between the body sections and the various operating, piston and control rods whenever it is necessary to seal therebetween. For example, the packers or seals 358 and 359 disposed in suitable recesses of the body section 208 seal between this body section and the operating rods 138 and 139, respectively.

The anvil 255 is threaded on the reduced upper end of the bit stem 360. A packer or sealing means 361 on the reduced upper end of the bit stem 360 seals between the body section 210 and the bit stem immediately below the anvil to prevent flow of fluid in the chamber or bore 256. The bit stem is biased upwardly in the body 210 by a spring 363 whose upper end bears against the downwardly facing shoulder 364 of the bit stem and whose lower end bears against an upwardly facing shoulder 365 of a connector mandrel 366 connected to the lower end of the body section 210 by a coupling 367. A packer or sealing means 368, held in position by a retainer ring 369 threaded on the bit section, seals between the bit stem and the connector mandrel 366 above the spring 363.

The area of the top surface of the retainer ring 369 is made equal to the cross sectional area of the bit stem 360 in order to balance the fluid pressures acting on the bit stem and allow its reciprocal movement.

A ratchet wheel 370 is mounted on the bit stem below the connector mandrel 366 and is held rigidly on the bit stem by means of keys 372 which extend into aligned grooves 373 and 374 in the ratchet wheel and in the bit stem, respectively. The ratchet wheel has the plurality of ratchet teeth of the usual configuration each having an abrupt shoulder 375 which extends vertically upwardly and a beveled shoulder 376 which extends angularly upwardly. A plurality of pawls 378 are mounted in a pawl housing 379 disposed on the bit stem and held in place by a pawl mandrel 380 threaded to the lower end of the connector mandrel 366. The pawls are biased downwardly by springs 382 whereby they are forced into engagement with the upper surface of the ratchet wheel 370. The ratchet pawls 378 so engage the teeth of the ratchet wheel 370 that they permit only counterclockwise rotation of the ratchet wheel and therefore of the bit stem, as seen from above in FIGURE 70, with respect to the tool body 101 since the pawl housing 379 is rigid with the body section.

A bit rotator 385 is disposed above the bit holder 418 and has an upper section 386 which is rigidly connected to the pawl mandrel 380 by means of a coupling 387 and a seal mandrel 389. The seal mandrel is provided with an internal annular recess in which is disposed a packer or seal means 388 which seals between the seal mandrel 389 and the bit stem 360 below the ratchet wheel 370. The lower bit rotator section 390 is slidably and rotatably mounted on the bit section and is connected to the upper bit rotator section 386 by means of bolts 391 whose upper ends are threaded into downwardly opening bores in the lower surface of the bit rotator section 386 and are held against rotation with respect thereto by means of lock nuts 392 which enter into enlarged portions of such threaded bores or recesses in the upper bit rotator section 386. The bolts 391 extend downwardly through the concentric longitudinal slots 393 in the lower bit rotator section 390 into outwardly opening recesses 394 where their lower ends are provided with a pair of nuts 395. The recesses of 394 are of somewhat greater width than the thickness of the nuts 395 whereby the lower section of the bit rotator may move downwardly with respect to the upper bit rotator section 386 from the position shown in FIGURE 71 to the position shown in FIGURE 72, the bolts and nuts 395 limiting such downward movement of the lower bit rotator section on the bit stem 360.

The lower bit rotator section 390 is biased for rotation in a clockwise direction, FIGURE 73, by a plurality of biasing assemblies 398 mounted in horizontal slots 399 of the lower bit rotator section 390 which communicates at one end with the bolt slots 393. Each biasing assembly 398 comprises a housing 400 having an open end into which telescopes a bolt 401 which is biased outwardly from the housing 400 by a spring 402. The opposite ends of the housing 400 and bolt 401 bear against a bolt 391 and against a stop block 404, respectively. The stop block closes one end of the bore 399 and is secured in a suitable recess, which communicates with one end of each bore 399, by a bolt 405 threaded into a suitable radial bore in the lower bit rotator section 390.

The upper and lower sections of the bit rotator are provided with aligned diagonally extending slots 410 and 411 in their adjoining lower and upper surfaces in which are received rods 412. Due to the action of the spring 363, the rods 412 cause the lower bit rotator section 390 to rotate in a counter-clockwise direction on the bit stem 360, FIGURE 69, whenever the bit rotator section 390 moves upwardly from the position shown in FIGURE 72 to the position shown in FIGURE 71. The lower bit rotator section 390 is provided with a plurality of downwardly facing teeth 414 which are adapted to engage the upwardly facing teeth 415 of the bit holder 418 of the drill bit 102. The bit holder 418 is rigidly secured to the lower end of the bit stem 360 being threaded thereon. The bit holder 418 is provided with the usual bits 420 on its lower end which engage the bottom of the well or of the formation.

It will now be apparent that when the hammer 254 moves downwardly and strikes the anvil 255, the bit stem 360 will be moved downwardly with respect to the body 101 which tends to remain longitudinally stationary due to the inertia of the body and of the cables which hold the drilling tool. Such downward movement of the bit stem 360 causes the lower bit rotator section 390 to move downwardly with respect to the upper bit rotator section 386 from the position shown in FIGURE 71 to the position shown in FIGURE 72. Such downward movement of the lower bit rotator section 390 is limited by the bolts 391 so that the bit holder 418 moves downwardly together with the bit stem 360 relative to the lower bit rotator section 390 once its downward movement is arrested by the bolts 391 whereby the teeth 414 of the lower bit rotator section 390 and the teeth 415 of the bit holder 418 disengage. The biasing assemblies 398 now cause the lower bit rotator section 390 to rotate the lower bit rotator 390 in a counter clockwise direction, as seen looking up on FIGURE 72, since a certain rotational movement is permitted due to the fact that the bolts 391 are in elongated concentric slots 393 of the lower bit rotator section. The bit holder 418 does not rotate at this time since its teeth 415 are now out of engagement with the teeth 414 of the lower bit rotator section 390. The rods 412 during such downward movement of the bit rotator section 390 move from their inclined positions, FIGURE 71, to more nearly vertical positions shown in FIGURE 72, the inclined slots 410 and 411 being of such conformation as to permit such movement of the rods. The spring 363 now moves the bit stem 360 upwardly whereby the teeth 414 and 415 engage and then cause the lower bit rotator section 390 to move upwardly with the bit stem 360 and the bit holder 418. During such upward movement of the bit rotator section 390 from the position in FIGURE 72 to the position shown in FIGURE 71, the rods 412 slide in their slots 410 and 411, the camming action exerted by the rounded lower ends of such rods now camming or forcing the lower bit rotator section 390 to rotate in a counter-clockwise direction (looking downwardly, FIGURE 70) around the bit stem 360 against the resistance of the springs 402 of the biasing assemblies 398 until the adjacent ends of the bit rotator sections abut. Such rotation of the lower bit rotator section 390, of course, causes the bit holder 418 to rotate therewith since the teeth 414 and 415 are now in engagement. The pawls 378 permit only such counter-clockwise rotation, looking downwardly, FIGURE 70, of the bit stem and therefore of the bit holder 418 and the bit rotator. In this manner the bit 102 is rotated slightly in a counter-clockwise direction looking down during each reciprocation of the drill bit stem 360, such rotational movement occurring only as the drill bit moves upwardly.

The body 101 is prevented from any rotational movement during such operation of the bit 102 by a pair or more of sharp edged rollers 425 mounted on the body section 201 by means of spring straps 426 which are suitably secured through the body section 201 by bolts 427. The body section is provided with oppositely facing recesses 428 into which the wheels and spring straps 426 may enter. It will be apparent that the sharp edged rollers 425 engage the walls of the hole being drilled and prevent rotation or turning of the body 101 of the well tool in the well.

The bit 420 is provided with the usual cutting members 430 mounted in a holder 431 threaded into the lower end of the bit holder 418. The bit mounting means 431 is provided with a plurality of apertures 432 which open upwardly into a scavenging duct 433 in the bit holder 418. The scavenging duct 433 of the bit holder 418 communicates with the lower end of the scavenging duct 434 of the bit stem 360. The scavenging duct 434 communicates at its upper end with the scavenging ducts 435 of the body 210 through a plurality of upwardly and outwardly inclined ports 436 below the anvil 255. The scavenging ducts 435 extend upwardly through the various body sections of the body 101 into the body section 208. The fluid from the scavenging ducts 435 is pumped or forced into a longitudinal scavenging passageway 437 whose upper end communicates with the lower end of the passage 190 of the member 203 of the body 101 and thence into the discharge passage 179 of the spout 175 by means of a pair of pistons 438 and 439 mounted on the operating rods 138 and 139, respectively, which reciprocate in cylinders 440 and 441, respectively, of the body section 208. Upward movement of the piston 438 in the cylinder 440 causes fluid from the scavenging ducts 435 to be drawn up into the cylinder 440 below the piston 438 through a transverse passage 442 which communicates with the scavenging ducts 435 and a scavenging longitudinal passage 443 whose upper end communicates with the cylinder 440. The transverse passage 442 is controlled by a check valve 445 which moves upwardly to the open position shown in FIGURE 20 when the piston 438 is moving upwardly. During such upward movement of the piston 438 the piston 439 is moving downwardly and during such downward movement of the piston 439 scavenging fluid from the scavenging ducts 435 is drawn or pumped into the cylinder 441 above the piston 439 through a transverse duct 448 which communicates with the scavenging ducts 435 and a longitudinal passage 449 which communicates with the upper end of the piston cylinder 441. The transverse passage 448 is controlled by a check valve 450 which moves to open position when the piston 439 is moving downwardly in the piston cylinder 441. During the upward movement of the piston 438, the fluid contained in the cylinder 440 above the piston 438 is forced upwardly into the passage 452 which communicates with the upper end of the piston cylinder 440 and through a transverse passage 451 into the scavenging passage 437. The transverse passage is controlled by a check valve 454 which is moved to its upper position when the piston 438 is moving upwardly. Simultaneously, while the piston 439 is moving downwardly in its cylinder 441, fluid contained in the cylinder 441 below the piston 439 is forced from the lower end of the cylinder 441 into a passage 455 and thence through a transverse passage 456 into the scavenging passage 437. The transverse passage 456 is controlled by a check valve 457 which is moved to its open position when the piston 439 is moving downwardly in its cylinder.

When the piston 438 moves downwardly in its cylinder 440, the scavenging fluid which had been drawn into the cylinder 440 below the piston 438 during its upward movement is forced into the passage 443, is forced through the transverse passage 460 to the scavenging duct 437, the check valve 461 which controls the passage 460 being moved to its open position during such downward movement of the piston 438. Simultaneously the scavenging fluid which had previously been drawn into the cylinder 441 above the piston 439 during downward movement of the piston 439 is now forced upwardly into the duct 449 and thence through the transverse passage 464 into the scavenging passage 437 which is controlled by a check valve 465 which is moved to open position during such upward movement of the piston 439.

During the downward movement of the piston 438, scavenging fluid from the ducts 435 is drawn into the cylinder 440 above the piston 438 through a transverse duct 470 which communicates with the ducts 435 and the passage 452 and which is controlled by a check valve 471 which is moved to its open position when the piston 438 is moving downwardly in its cylinder 440. Simultaneously and similarly while the piston 439 is moving upwardly, scavenging fluid from the scavenging ducts 435 is drawn into the cylinder 441 below the piston 439 through a transverse duct 474 which communicates with the scavenging ducts 435 and the passage 455 and is controlled by a check valve 475 which is moved to open position when the piston 439 is moving upwardly in its cylinder 441.

It will now be apparent that the pistons 438 and 439 together with the various check valves act as a pumping means for circulating fluid from the bottom of the hole or well being drilled to the bailer 103 and that any cuttings or other matter carried by the fluids is deposited or strained in the bailer 103 as the fluid flows outwardly from the bailer through the screen 194. When the bailer chamber 192 is filled with such cuttings, the winch 158 may be rotated to move the bailer 103 out of the well to the surface where the chamber 192 may be dumped of such cuttings by the removal of the bottom end plug 177 and the bailer may then again be lowered into the well to again seat on the tubing extension 181.

While for purposes of illustration only one scavenging piston 438 or 439 has been shown on each operating rod, it is readily apparent that a plurality of such pistons could be mounted on each such operating rod slidable in suitable piston chambers. Similarly a greater number of fluid pump pistons, such as the pistons 213 and 214, could be provided on each operating rod.

It will be apparent that the various check valves which control the flow of fluid through the various transverse passages in the manner described above are shown schematically. The body sections of the well tool in which such check valves are located may be formed of plurality sections to permit assembly of such check valves in the respective body sections. Such sections of the body sections are of course connected together by couplings and separated by gaskets as described above.

It will now be seen that a new and improved well tool has been provided for drilling wells which is provided with a reciprocable hammer which is operated by a piston 220. It will be further seen that the piston 220 is reciprocated by a compressed fluid from a pressure passageway or chamber 232 which is admitted into the hammerlift piston cylinder 222 alternately on opposite sides of the hammerlift piston 220 by means of control valves 224 and 225 and these control valves are operated whenever the hammerlift piston 220 reaches extreme limits of its movement in either direction by means of the compression piston 327 which moves with the piston cylinder 220. Cylinders 218, 219, 211 and 212, ducts 232 and 262, and cylinder 222 and other spaces communicating with these cylinders and ducts are filled with a compressed fluid to a predetermined degree through suitable inlet valves 500 which communicate with the ducts 232 and 262. It will further be seen that the pressure passageway 232 is filled with compressed fluid which is circulated by the operation of the pump pistons 213, 214, 216 and 217 of the operating rods 138 and 139 which are reciprocated by means of the operating cables 104 and 105, respectively.

It will further be seen that the hammer 254 strikes an anvil 255 during each downward movement thereof to cause a bit 102 to strike downwardly against the bottom of the well being drilled to thus effect the drilling operation. It will further be seen that a bit rotator is interposed between the anvil and the bit to cause rotation of the bit.

It will thus be seen that the drilling operations of the well tool are performed and carried out by the alternate longitudinal reciprocation of the operating rods 138 and 139 by means of the flexible cables or operating cables 104 and 105, the whole well tool being lowerable and operable by means of flexible lines whereby the operation and removal of the well tool in the well is facilitated since the laborious and tedious operations necessitated by the use of drill pipe sections with conventional drill bits are obviated. It will further be seen that the operating rods are also provided with scavenger pump pistons 438 and 439 whereby the fluid in the well is circulated from the bottom of the well to a bailer where the cuttings and other debris are strained from such well fluid. It will be further seen that the bailer is removable separately from the well whereby the cuttings may be dumped from the bailer once it has been moved to the surface and the bailer returned to its position on the well tool without necessitating the removal of the whole well tool from the well.

It will thus be seen that a new and improved well tool for drilling holes has been described and illustrated which affects all operations by means of flexible lines or operating cables and requires no drill pipe connection from the surface to the drill bit and no need of circulating drilling fluid through the well.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well tool for drilling wells comprising: an elongate body lowerable into a well by flexible wire line means connectable to the body and extendable downwardly in the well, a drill bit mounted on the lower end of the body for limited longitudinal movement relative to the body; and operating means in the body for imparting downward blows to the drill bit, said operating means comprising a hammer longitudinally movable in said body for striking the upper end of the drill bit, and fluid pressure means carried by the body operable by said wire line means extending downwardly in the well and connected to said fluid pressure means for reciprocating said hammer to impart blows to the drill bit.

2. A well tool for drilling wells comprising: an elongate body lowerable into a well by means of flexible wire line means connectable to the body and extendable downwardly in the well, a drill bit mounted on the lower end of the body for limited longitudinal movement relative to the body; and operating means in the body for imparting downward blows to the drill bit, said operating means comprising a hammer longitudinally movable in said body for striking the upper end of the drill bit, and fluid pressure means operable by said wire line means extending downwardly in the well and connected to said fluid pressure means for reciprocating said hammer to impart blows to the drill bit, said fluid pressure means for reciprocating said hammer comprising a piston connected to said hammer and movable in a piston cylinder provided in the body, and means carried by the body and responsive to the movement of the hammer longitudinally movable relative to the body for alternately admitting fluid under pressure into said cylinder on opposite sides of said piston.

3. A well tool for drilling wells comprising: an elongate body lowerable into a well by flexible means connectable to the body, a drill bit mounted on the lower end of the body for limited longitudinal movement relative to the body; and operating means in the body for imparting downward blows to the drill bit, said operating means comprising a hammer longitudinally movable in the body for striking the upper end of the drill bit, and fluid pressure means operable by said flexible means extending downwardly in the well and connected to said fluid pressure means for reciprocating said hammer to impart blows to the drill bit, said fluid pressure means for reciprocating said hammer comprising a piston connected to said hammer and movable in a piston cylinder provided in the body, and means responsive to the longitudinal movement of the hammer relative to the body for alternately admitting fluid under pressure into said cylinder on opposite sides of said piston, said fluid pressure means including pump means carried by the body and operable by said flexible line means for supplying fluid under pressure to said piston cylinder.

4. A well tool for drilling wells comprising: an elongate body lowerable into a well by flexible line means connectable to said body, a drill bit mounted on the lower end of the body for limited longitudinal movement relative to the body, and operating means in the body for imparting downward blows to the drill bit, said operating means comprising a hammer longitudinally movable relative to said body for striking the upper end of the drill bit, fluid pressure means operable by said flexible line means extending downwardly in the well and connected to said fluid pressure means for reciprocating said hammer to impart blows to the drill bit, and means in said body interposed between said body and said drill bit and operatively associated with said drill bit for rotating said drill bit each time said drill bit is reciprocated.

5. A well tool for drilling wells comprising: an elongate body lowerable into a well by flexible wire line means connectable to the body and extendable downwardly into the well, a drill bit mounted on the lower end of the body for limited longitudinal movement relative to the body; and operating means in the body for imparting downward blows to the drill bit, said operating means comprising a hammer longitudinally movable relative to the body for striking the upper end of the drill bit, and fluid pressure means operable by said wire line means extending downwardly in the well and connected to said fluid pressure means for reciprocating said hammer to impart blows to the drill bit, said fluid pressure means for reciprocating said hammer comprising a piston connected to said hammer and movable in a piston cylinder provided in said body, means in said body operatively associated with and responsive to the movement of the hammer for alternately admitting fluid under pressure into said cylinder on opposite sides of said piston, and means operatively associated with said drill bit in said body for resiliently biasing said drill bit upwardly relative to said body.

6. A well tool for drilling wells comprising: an elongate body lowerable into the well by flexible wire line means connected to the elongate body and extendable downwardly in the well, a drill bit mounted on the lower end of the body for limited longitudinal movement relative to the body; and operating means in the body for imparting downward blows to the drill bit, said operating means comprising a hammer longitudinally movable relative to the body for striking the upper end of the drill bit, and fluid pressure means operable by said wire line means extending downwardly in the well and connected to said fluid pressure means for reciprocating said hammer to impart blows to the drill bit, said fluid pressure means for reciprocating said hammer comprising a piston connected to said hammer and movable in a piston cylinder provided in said body; means including flow passage means communicating with said cylinder on opposite sides of said piston and valve means controlling flow of fluid through said flow passage means responsive to the movement of the hammer for alternately admitting fluid under pressure into said cylinder on opposite sides of said piston, said fluid pressure means in said body including pump means operable by said flexible members for supplying fluid under pressure through said flow passage means to said piston cylinder, and means biasing said drill bit upwardly relative to said body.

7. A well tool for drilling wells comprising: a body; a drill bit mounted on the lower end of said body for limited longitudinal movement relative to said body; means biasing said drill bit upwardly on said body; flexible line means carried by said body and operable from the surface of the well by means of said flexible line means connected thereto and extending into the well for imparting downward blows to the drill bit; a flow passage extending from the drill bit to the body; a bailer on the upper end of the body, said well tool being lowerable into a well by flexible means connectable to said bailer; and pump means operable by said flexible line means for pumping fluids upwardly from the bottom of the well to the passage and into said bailer.

8. A well tool for drilling wells comprising: a body lowerable into the well by flexible means connectable to the body; a drill bit mounted on the lower end of the body for limited longitudinal movement relative to the body, said drill bit having an upper anvil end disposed in the body; means biasing said drill bit resiliently upwardly relative to said body; hammer means reciprocably mounted in said body above said upper anvil end of said drill bit for imparting downward blows to said drill bit; operating means for imparting reciprocal movement to said hammer; pump means mounted in said body and operable by flexible members extending downwardly from the surface of the well for pumping fluid under pressure into a pressure passageway provided in said body; control means carried by said body and responsive to the movement of the hammer for releasing the fluid under pressure from said pressure passageway to said hammer operating means for actuating the latter to impart reciprocal movement to said hammer; and means operatively associated with said body and said drill bit for imparting rotational movement to said drill bit upon each reciprocation of said drill bit.

9. A well tool for drilling wells comprising: a body lowerable into a well by flexible means connectable to said body; a drill bit mounted on the lower end of said body for limited longitudinal movement relative to said body, said drill bit having an upper anvil end extending into said body; a hammer reciprocably mounted in said body above said upper anvil end of said drill bit for imparting downward blows to said upper anvil end of said drill bit; said body having a cylinder; a piston connected to said hammer slidable in said cylinder; a pressure passageway having a compressible fluid under pressure therein; control means carried by said body and operatively associated with said hammer and responsive to the movement of said hammer for alternately connecting said pressure passageway to said cylinder on opposite sides of said piston; and pump means carried by said body for supplying compressible fluid to said pressure passageway operable by flexible line means extending downwardly from the surface of the well and connected to said pump means for pumping fluid into said pressure passageway.

10. A well tool for drilling wells comprising: a body lowerable into a well by a flexible means connectable to the body; a drill bit mounted on the lower end of said body for limited longitudinal movement relative to said body, said drill bit having an upper anvil end extending into said body; a hammer reciprocably mounted in said body above said upper anvil end of said drill bit for imparting downward blows to said upper anvil end of said drill bit; said body having a cylinder; a piston connected to said hammer slidable in said cylinder; a pressure passageway provided in the body having a compressible fluid under pressure therein; control means carried by the body and operatively associated with the hammer and responsive to the movement of said hammer for alternately connecting said pressure passageway to said cylinder on opposite sides of said piston; pump means carried by the body for supplying compressible fluid to said pressure passageway operable by flexible line means extending downwardly from the surface of the well and connected to said pump means for pumping fluid into said pressure passageway; said body having passages communicating with said pump means and said cylinder, said control means permitting flow of fluid from the cylinder alternately from opposite sides of said piston to said pump means whereby said compressible fluid is recirculated from said cylinder to said pump means during operation of said well tool.

11. A well tool for drilling wells comprising: a body lowerable into a well by flexible means connectable to the body; a drill bit mounted on the lower end of said body for limited longitudinal movement relative to said body, said drill bit having an upper anvil end extending into said body; a hammer reciprocably mounted in said body above said upper anvil end of said drill bit for imparting downward blows to said upper anvil end of said drill bit; said body having a cylinder; a piston connected to said hammer slidable in said cylinder; a pressure passageway provided in the body having a compressible fluid under pressure therein; control means carried by the body operatively associated with the hammer and responsive to the movement of said hammer for alternately connecting said pressure passageway to said cylinder on opposite sides of said piston; pump means for supplying compressible fluid to said pressure passageway operable by flexible line means extending downwardly from the surface of the well for pumping fluid into said pressure passageway; said body having passages communicating with said pump means and said cylinder, said control means permitting flow of fluid from the cylinder alternately from opposite sides of said piston to said pump means whereby said compressible fluid is recirculated from said cylinder to said pump means during operation of said well tool; said pump means being operated by longitudinally operable operating rods reciprocably extending through said body, said flexible line means being connected to the upper ends of said operating rods.

12. A well tool for drilling wells comprising: a body; a drill bit mounted on the lower end of said body for limited longitudinal movement relative to said body, said drill bit having an upper anvil end extending into said body; a hammer reciprocably mounted in said body above said upper anvil end of said drill bit for imparting downward blows to said upper anvil end of said drill bit; said body having a cylinder; a piston connected to said hammer slidable in said cylinder; a pressure passageway having a compressible fluid under pressure therein; control means responsive to the movement of said hammer for alternately connecting said pressure passageway to said cylinder on opposite sides of said piston; pump means for supplying compressible fluid to said pressure passageway operable by flexible members from the surface of the well for pumping fluid into said pressure passageway; said body having passages communicating with said pump means and said cylinder, said control means permitting flow of fluid from the cylinder alternately from opposite sides of said piston to said pump means whereby said compressible fluid is recirculated from said cylinder to said pump means during operation of said well tool; said pump means being operated by longitudinally operable operating rods reciprocably extending through said body, said flexible members being connected to the upper ends of said operating rods; said control means comprising valves operable by a control piston slidably mounted in a cylinder provided in the body; said hammer being provided with a second piston reciprocably mounted in a cylinder; said second cylinder alternately pumping fluid under pressure to said cylinder of said control piston on opposite sides of said control piston, whereby said control piston is reciprocated each time said hammer is reciprocated.

13. A well tool for drilling wells comprising: a body; a drill bit mounted on the lower end of the body for limited longitudinal movement relative to the body, said drill bit having an upper anvil end disposed in the body; means biasing said drill bit resiliently upwardly relative to said body; hammer means reciprocably mounted in said body above said anvil end of said drill bit for imparting downward blows to said drill bit; a pair of pump means mounted in said body for simultaneous opposite reciprocable movement operable by flexible line means extending downwardly from the surface of the well and connected to said pump means for pumping fluid under pressure into a pressure passageway, said pump means including equalizing means operatively associated therewith for preventing movement of the body due to reciprocation of said pump means by said flexible line means; and control means carried by the body and operatively associated with the hammer and responsive to the movement of the hammer for releasing the fluid under pressure from said pressure passageway to said hammer operating means for actuating the latter to impart reciprocal movement to said hammer.

14. The well tool of claim 13 characterized in that said pump means include a pair of operating rods having pistons reciprocable in cylinders provided in said body, said pistons being simultaneously reciprocable in opposite directions, said body having a transverse passage connecting the upper portions of said cylinders above said pistons whereby said cylinders may be filled with a pressurized fluid above said pistons, said pressurized fluid equalizing the forces imparted to said body by reciprocal movement of said pistons in said cylinders.

15. A well tool for drilling wells comprising: a body; a drill bit mounted on the lower end of said body for limited longitudinal movement relative to said body; means for imparting downward blows to the drill bit; means biasing said drill bit upwardly on said body; flexible line means extending from the surface of the well to said body, said flexible line means being connected to said means for imparting downward blows to the drill bit and operable from the surface of the well, said operable means including pump means for placing fluid under pressure in a chamber provided in said body, and means carried by said body and operatively associated with said pump means and responsive to the operation of said pump means for actuating said means for imparting downward blows to impart a plurality of blows to said drill bit during each cycle of operation of said pump means.

16. A well tool for drilling wells comprising: a body; a drill bit mounted on the lower end of said body for limited longitudinal movement relative to said body; means carried by said body for imparting downward blows to the drill bit means biasing said drill bit upwardly of said body; means carried by the body operable from the surface of the well by means of flexible line means extending into the well and connected to said means carried by said body for imparting downward blows to the drill bit, said operable means including pump means for placing fluid under pressure in a chamber provided in said body; and balancing means provided in the body and operatively associated with said pump means for preventing movement of the body due to operation of said pump means.

17. The well tool of claim 13 characterized in that said pump means includes a pair of operating rods having pistons reciprocable in cylinders provided in said body, said pistons being simultaneously reciprocable in opposite directions, said body having a transverse passage connecting the upper portions of said cylinders above said pistons whereby said cylinders may be filled with a non-compressible fluid above said pistons, said non-compressible fluid equalizing the forces imparted to said body by reciprocal movement of said pistons on said cylinders.

References Cited in the file of this patent

UNITED STATES PATENTS

| | | |
|---|---|---|
| 724,160 | Clark et al. | Mar. 31, 1903 |
| 1,082,901 | Perkins | Dec. 30, 1913 |
| 1,330,736 | Church | Feb. 10, 1920 |
| 1,457,181 | Mable | May 29, 1923 |
| 1,861,042 | Zublin | May 31, 1932 |
| 2,013,070 | Sheridan | Sept. 3, 1935 |
| 2,033,527 | Kitching | Mar. 10, 1936 |
| 2,241,712 | McNamara | May 13, 1941 |
| 2,243,319 | Ross | May 27, 1941 |